United States Patent Office 3,663,623
Patented May 16, 1972

---

3,663,623
PREPARATION OF IODOMETHYLSULFONES
Aldo J. Crovetti, Lake Forest, and Martin Winn, Waukegan, Ill., assignors to Abbott Laboratories, North Chicago, Ill.
No Drawing. Filed July 25, 1969, Ser. No. 845,071
Int. Cl. C07c 147/02
U.S. Cl. 260—607 A          4 Claims

ABSTRACT OF THE DISCLOSURE

A general preparation of iodomethylsulfones in which iodine monochloride is reacted with a substituted sulfonyl acetic acid in a reaction mixture maintained at a nearly neutral pH to produce a superior conversion.

DISCLOSURE OF THE INVENTION

This invention relates to a method for the preparation of iodomethylsulfones which results in a superior conversion, and in particular to a method which produces a superior conversion of starting material into final product.

According to the prior art, it is known to prepare certain iodomethylsulfones of the formula

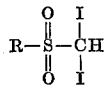

wherein R is phenyl, substituted phenyl and n-alkyl from 4 to about 7 carbon atoms by iodination of the corresponding phenyl or n-alkyl sulfonyl acetic acids. The iodine is introduced in the form of sodium hypoiodite in a strongly alkaline solution. Under these conditions, however, 50 percent of the expensive iodine reagent is converted to sodium iodide and so is not available for reaction. Moreover, the reaction goes poorly, if at all, when R is a group such as tertiary butyl or benzyl.

It is an object of this invention, therefore, to provide a more general method for the preparation of iodomethylsulfones.

It is a further object of this invention to provide a method for the preparation of iodomethylsulfones which gives a high percentage of conversion with respect to the iodinating agent and also with respect to the sulfone starting material. The term "conversion" indicates the percentage of starting material accounted for in the final product; in calculating conversion no allowance is made for recoverable starting reagents.

These and other objects which will become apparent from the following examples are achieved through the provision of a method in which the iodinating agent is iodine monochloride and it is reacted with a substituted sulfonyl acetic acid in a neutral or near-neutral solution. Preferably the reaction solution is established and maintained at a pH between about 6 and about 8.

In general, a substituted sulfonyl acetic acid of the formula

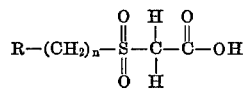

is dissolved in an aqueous solution of an alkali metal hydroxide. The group identified as R may include alkyl, cycloalkyl, phenyl, loweralkylphenyl, monohalophenyl, anilino, anilamido, loweralkoxyphenyl, naphthyl, nitrophenyl, halonitrophenyl, nitroloweralkylphenyl, haloloweralkylphenyl, polyloweralkylphenyl and polyhalophenyl wherein the halogen is selected from the group consisting of fluorine, bromine and iodine and $n$ may be an integer from 0 to 4. The term "loweralkyl" is intended to include those substituents having up to 7 carbon atoms. By "alkyl" it is meant those substituents having up to about 20 carbon atoms and includes, additionally, those alkyl groups having more than about 20 carbon atoms which do not substantially alter the essential activity or character of the remainder of the molecule. The method is especially useful when R is phenylloweralkyl, cycloalkylloweralkyl and t-butyl because such compounds are most difficult to iodinate by the processes of the prior art.

The method of this invention may be employed in the preparation of monoiodomethylsulfones and diiodomethylsulfones. In practicing the method, the aqueous reaction mixture initially contains, in addition to the sulfonyl acetic acid starting material, a quantity of an alkali metal hydroxide sufficient to neutralize the acid plus one or two equivalent amounts depending on whether the monoiode or diiode product is desired. A slight excess over the theoretical quantity of iodine monochloride is added to the solution which is stirred at a temperature of less than about 40° C. At this temperature, the reaction takes about 4 hours. The reaction mixture is maintained at a near neutral pH by periodic additions of an acidifying agent.

Some of the less soluble compounds may require addition of a minor amount of a solvent such as tetrahydrofuran. The less soluble reagents may also be emulsified for increased contact surface.

The control of the pH of the reaction mixture is essential and unless it is maintained near a neutral value, low yields will result. The presence of the yellow color serves as a convenient internal indicator of the desired pH but other appropriate pH indicators or a pH meter may, of course, be employed.

The mechanism by which this reaction takes place has not been determined, but it may be that the conversion of the alkylsulfonyl acetic acid to the sodium salt gives appreciable ionization of the alpha hydrogen so that sodium ions may also react at the alpha carbon. The actual iodinating agent may be HOI, and the reaction conditions are such that the sulfone is present as the sodium salt but the alkalinity is not allowed to become so great as to convert all the HOI to NaOI.

When the iodination has been accomplished, the reaction mixture is acidified, as with hydrochloric acid, and decarboxylation of the iodinated compound takes place. The reaction mixture is then made basic and the product isolated by methods familiar to those skilled in the art. For example, the product may be extracted with chloroform, washed with sodium sulfite solution, dried over magnesium sulfate and crystallized from diethyl ether.

In the examples immediately following, Example 1A and 1B illustrate the preparation of a suitable starting material, tertiary butyl sulfonyl acetic acid. Example 1B illustrate the iodination of tertiary butyl sulfonylacetic acid with iodine monochloride by a process which does not employ the nearly neutral reaction medium of this invention.

Example 1A

Tertiary butyl sulfonylacetic acid was prepared from tertiary butyl thioglycolic acid by the following method. Two equivalents, plus a 5 percent excess, of peracetic acid (40%) were dissolved in an equal weight of acetic acid. To this solution, the tertiary butyl thioglycolic acid was added at a rate sufficient to keep the temperature below 65° C.; when needed, cooling was supplied by an ice bath. Upon completion of the thioglycolic acid addition, the reaction mixture was heated at 65° for 1 hour. The excess peroxide was decomposed with formaldehyde, the solution was concentrated, and the product recovered by crystallization.

Example 1B

Ten grams of tertiary butyl sulfonylacetic acid obtained according to the process of Example 1A were dissolved in 40 ml. of water and 4.5 g. of 50 percent sodium hydroxide. To this was added a previously prepared solution of 27 g. of iodine monochloride, 27 g. of 50 percent sodium hydroxide and 160 ml. of water. The reaction mixture was cooled so that its temperature was maintained at less than 40° C. and stirring was continued for 4 hours. The reaction mixture was then acidified with 35 ml. of concentrated hydrochloric acid followed by 1 hour of stirring during which time the decarboxylation was accomplished with evolution of carbon dioxide. The resulting reaction mixture was made basic, extracted with chloroform and washed with sodium sulfite solution. The product was dried over magnesium sulfate, concentrated and crystallized from diethyl ether. The first crop of crystals weighed 5.5 g. and the melting point was 90 to 95° C. The second crop amounted to 2.5 g. and melted at 93 to 98° C. A third crop of 0.85 g. was obtained and melted at 90 to 96° C. NMR spectra show the first crop to comprise 72% of the diiodo compound and 28% of the monoiodo methyl t-butyl sulfone. Thus, the conversion to the diiodo compound was about 30% based on the sulfone and only about 20% based on the iodine monochloride.

The following examples will illustrate the method of this invention but are not intended to be limiting. Particularly noteworthy is the much higher conversion obtained and the improved purity of the product.

Example 2

Forty grams of tertiary butyl sulfonylacetic acid and 85 grams of iodine monochloride were placed in 600 ml. of water with sufficient 50% sodium hydroxide (about 96 g.) to render the solution a pale yellow color. The temperature was maintained at 40° C. and the reaction mixture was stirred for 4 hours. During this period, 8 ml. of concentrated HCl were added in small portions to maintain a pale yellow color. The reaction mixture was acidified to decarboxylate the iodinated product which was subsequently worked up as in Example 1B above. The first crop amounted to 56.7 g. of crystals melting at 103–105° C. which crystals were 100% of the diiodo compound as determined by a NMR spectrum. A second crop of 9.8 g. melting at 90 to 103° C. was obtained and was estimated to be 90% diiodo compound. Thus, the total conversion of sulfone starting material to the t-butyl diiodomethylsulfone was 76% and the conversion based on the iodine monochloride was 65%.

Other acidifying agents might be substituted for the HCl and the reaction proceeds very satisfactorily when iodomonochloride is employed for this purpose. However, iodomonochloride is ordinarily too expensive for such use and some agent less costly would be preferred for economic reasons.

Control of the acidity of the reaction mixture may also be exercised by reducing the amount of hydroxide added initially. Such a procedure is illustrated in the following example.

Example 3

A reaction mixture was prepared with the reagents of Example 2 but in the following amounts: NaOH—26 g. of 50% aqueous solution (0.325 M); ICl—36 g. (0.222 M); sulfone—18 g. (0.1 M), the sulfone being added last. Thus, the quantity of sodium hydroxide added was only about half of that used in Example 2. The iodine monochloride, consequently, did not go into solution and the reaction mixture was a suspension of dark brown color. The mixture was stirred for 4 hours at 40° C. with no color change. It was then acidified for the decarboxylation step and the product was worked up according to the steps described in Example 1B. A first crop of 23.9 g. of crystals melted at 72° to 98° C. and comprised 88% of the diiodo compound according to an NMR spectrum. A second crop of 2.5 g. melting at 70–95° C. was also obtained. Thus, the conversion based on the starting sulfone material and also on the iodine monochloride was about 54%.

The compound of Example 2 was tested in vitro against the fungus, *Fusarium oxysporium*, which causes surface rot in sweet potatoes and found to inhibit its growth at a concentration of 100 parts per million. The same compound also was tested against common bread mold fungus, *Rhizobus nigricans*, which causes soft rot in sweet potatoes and effectively inhibited its growth at a concentration of 100 parts per million.

Other diiodomethylsulfone compounds which are prepared by the process of this invention are: tolyl-, phenyl-, n-heptyl-, aminophenyl-, t-butylphenyl-, bromophenyl-, anisyl-, naphthyl-, n-butyl-, benzyl-, dimethylphenyl-, dichlorophenyl-, chlorophenyl-, chlorobenzyl-, isopropylphenyl-, fluorobenzyl-, n-decyl-, and cyclohexyl.

Monoiodomethylsulfone compounds which are made by the process of this invention are: benzyl-, ethyl- and nitro-methylphenyl.

Without further elaboration, it is believed that one skilled in the art, from the foregoing description and examples, is enabled to use this invention to its fullest extent.

We claim:

1. The method of iodinating a sulfonyl acetic acid of the formula

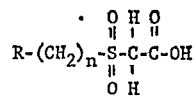

wherein R is selected from the group consisting of alkyl, cycloalkyl, phenyl, loweralkylphenyl, monohalophenyl, loweralkoxyphenyl, naphthyl, nitrophenyl, halonitrophenyl, nitroloweralkylphenyl, haloloweralkylphenyl, polyloweralkylphenyl and polyhalophenyl wherein halo is selected from the group consisting of fluoro, bromo or iodo and $n$ is an integer from 0 to 4, by reacting said acid with an alkali metal hydroxide and iodine monochloride in water with stirring at a temperature of about 40° C. or less for a reaction period of about 4 hours and maintaining the reaction mixture at a pH of between 6 to 8 during the reaction period until precipitation of the desired product stops and evolution of carbon dioxide ceases and recovering the iodinated product, said alkali metal hydroxide being present in an amount sufficient to supply from one to three moles of hydroxide per mole of sulfonyl acetic acid and said iodine monochloride being present in an amount sufficient to supply from one to two moles of iodine per mole of said acid.

2. The method of claim 1 wherein NaOH is added in an amount sufficient to render the reaction mixture initially a pale yellow color, and including the step of thereafter periodically adding an acidic agent in an amount sufficient to maintain said color.

3. The method of claim 2 wherein HCl is added to maintain the yellow color.

4. The method of claim 2 wherein ICl is added to maintain the yellow color.

References Cited

Ammo et al.: "Chem. Abstracts," vol. 69 (1968), p. 96242d.

JOSEPH REBOLD, Primary Examiner

D. R. PHILLIPS, Assistant Examiner

U.S. Cl. X.R.

260—514 R, 515 M, 526 R, 551 R, 558 S, 577; 424—335